(12) United States Patent
Peng

(10) Patent No.: US 7,516,341 B2
(45) Date of Patent: Apr. 7, 2009

(54) POWER-SAVING CIRCUITRY AND METHOD OF CPU

(75) Inventor: Chang-Ching Peng, Taipei County (TW)

(73) Assignee: Mitac Technology Corp., Hsinchu (TW)

( * ) Notice: Subject to any disclaimer, the term of this patent is extended or adjusted under 35 U.S.C. 154(b) by 544 days.

(21) Appl. No.: 11/160,204

(22) Filed: Jun. 14, 2005

(65) Prior Publication Data

US 2006/0069937 A1   Mar. 30, 2006

(30) Foreign Application Priority Data

Sep. 27, 2004   (TW) ............... 93129183 A

(51) Int. Cl.
 G06F 1/32   (2006.01)
 G06F 1/22   (2006.01)
 G06F 1/24   (2006.01)
 G06F 1/26   (2006.01)
(52) U.S. Cl. .................. 713/320; 713/300; 713/323
(58) Field of Classification Search ............... 713/300, 713/310, 320, 321, 323, 324
 See application file for complete search history.

(56) References Cited

U.S. PATENT DOCUMENTS 6,525,599 B2 * 2/2003 Nguyen et al. ............ 327/544
2002/0041263 A1 * 4/2002 Aoki ........................ 345/55
2002/0109489 A1 * 8/2002 Shaver et al. ............. 323/283
2003/0009702 A1 * 1/2003 Park ......................... 713/300
2004/0003301 A1 * 1/2004 Nguyen .................... 713/300
2004/0179382 A1 * 9/2004 Thaker et al. ............. 363/74
2005/0200342 A1 * 9/2005 Rudiak ..................... 323/282

* cited by examiner

Primary Examiner—Thomas Lee
Assistant Examiner—Fahmida Rahman
(74) Attorney, Agent, or Firm—Quintero Law Office

(57) ABSTRACT

A power-saving circuitry of CPU is provided. The power-saving circuitry comprises a switching transistor having a first source/drain electrode being grounded, a second source/drain electrode being electrically coupled to a DC power, and a gate electrode being electrically coupled to the CPU. When the CPU is under a normal operation mode, the switching transistor is turned on. When the CPU is under a power-saving mode (such as a C3 state), the switching transistor is turned off. In addition, the present invention further comprises a diode. Wherein, an anode of the diode is electrically coupled to the second source/drain electrode of the switching transistor, and a cathode of the diode is electrically coupled to a highest bit code of the voltage identification code of the CPU, so as to output the highest bit code of the voltage identification code of the CPU.

6 Claims, 3 Drawing Sheets

| VID 5 | 4 | 3 | 2 | 1 | 0 | Vcore(v) | VID 5 | 4 | 3 | 2 | 1 | 0 | Vcore(v) |
|---|---|---|---|---|---|---|---|---|---|---|---|---|---|
| 0 | 0 | 0 | 0 | 0 | 0 | 1.708 | 1 | 0 | 0 | 0 | 0 | 0 | 1.196 |
| 0 | 0 | 0 | 0 | 0 | 1 | 1.692 | 1 | 0 | 0 | 0 | 0 | 1 | 1.180 |
| 0 | 0 | 0 | 0 | 1 | 0 | 1.676 | 1 | 0 | 0 | 0 | 1 | 0 | 1.164 |
| 0 | 0 | 0 | 0 | 1 | 1 | 1.660 | 1 | 0 | 0 | 0 | 1 | 1 | 1.148 |
| 0 | 0 | 0 | 1 | 0 | 0 | 1.644 | 1 | 0 | 0 | 1 | 0 | 0 | 1.132 |
| 0 | 0 | 0 | 1 | 0 | 1 | 1.628 | 1 | 0 | 0 | 1 | 0 | 1 | 1.116 |
| 0 | 0 | 0 | 1 | 1 | 0 | 1.612 | 1 | 0 | 0 | 1 | 1 | 0 | 1.100 |
| 0 | 0 | 0 | 1 | 1 | 1 | 1.596 | 1 | 0 | 0 | 1 | 1 | 1 | 1.084 |
| 0 | 0 | 1 | 0 | 0 | 0 | 1.580 | 1 | 0 | 1 | 0 | 0 | 0 | 1.068 |
| 0 | 0 | 1 | 0 | 0 | 1 | 1.564 | 1 | 0 | 1 | 0 | 0 | 1 | 1.052 |
| 0 | 0 | 1 | 0 | 1 | 0 | 1.548 | 1 | 0 | 1 | 0 | 1 | 0 | 1.036 |
| 0 | 0 | 1 | 0 | 1 | 1 | 1.532 | 1 | 0 | 1 | 0 | 1 | 1 | 1.020 |
| 0 | 0 | 1 | 1 | 0 | 0 | 1.516 | 1 | 0 | 1 | 1 | 0 | 0 | 1.004 |
| 0 | 0 | 1 | 1 | 0 | 1 | 1.500 | 1 | 0 | 1 | 1 | 0 | 1 | 0.988 |
| 0 | 0 | 1 | 1 | 1 | 0 | 1.484 | 1 | 0 | 1 | 1 | 1 | 0 | 0.972 |
| 0 | 0 | 1 | 1 | 1 | 1 | 1.468 | 1 | 0 | 1 | 1 | 1 | 1 | 0.956 |
| 0 | 1 | 0 | 0 | 0 | 0 | 1.452 | 1 | 1 | 0 | 0 | 0 | 0 | 0.940 |
| 0 | 1 | 0 | 0 | 0 | 1 | 1.436 | 1 | 1 | 0 | 0 | 0 | 1 | 0.924 |
| 0 | 1 | 0 | 0 | 1 | 0 | 1.420 | 1 | 1 | 0 | 0 | 1 | 0 | 0.908 |
| 0 | 1 | 0 | 0 | 1 | 1 | 1.404 | 1 | 1 | 0 | 0 | 1 | 1 | 0.892 |
| 0 | 1 | 0 | 1 | 0 | 0 | 1.388 | 1 | 1 | 0 | 1 | 0 | 0 | 0.876 |
| 0 | 1 | 0 | 1 | 0 | 1 | 1.372 | 1 | 1 | 0 | 1 | 0 | 1 | 0.860 |
| 0 | 1 | 0 | 1 | 1 | 0 | 1.356 | 1 | 1 | 0 | 1 | 1 | 0 | 0.844 |
| 0 | 1 | 0 | 1 | 1 | 1 | 1.340 | 1 | 1 | 0 | 1 | 1 | 1 | 0.828 |
| 0 | 1 | 1 | 0 | 0 | 0 | 1.324 | 1 | 1 | 1 | 0 | 0 | 0 | 0.812 |
| 0 | 1 | 1 | 0 | 0 | 1 | 1.308 | 1 | 1 | 1 | 0 | 0 | 1 | 0.796 |
| 0 | 1 | 1 | 0 | 1 | 0 | 1.292 | 1 | 1 | 1 | 0 | 1 | 0 | 0.780 |
| 0 | 1 | 1 | 0 | 1 | 1 | 1.276 | 1 | 1 | 1 | 0 | 1 | 1 | 0.764 |
| 0 | 1 | 1 | 1 | 0 | 0 | 1.260 | 1 | 1 | 1 | 1 | 0 | 0 | 0.748 |
| 0 | 1 | 1 | 1 | 0 | 1 | 1.244 | 1 | 1 | 1 | 1 | 0 | 1 | 0.732 |
| 0 | 1 | 1 | 1 | 1 | 0 | 1.228 | 1 | 1 | 1 | 1 | 1 | 0 | 0.716 |
| 0 | 1 | 1 | 1 | 1 | 1 | 1.212 | 1 | 1 | 1 | 1 | 1 | 1 | 0.700 |

FIG. 2

POWER-SAVING CIRCUITRY AND METHOD OF CPU

CROSS-REFERENCE TO RELATED APPLICATION

This application claims the priority benefit of Taiwan application serial no. 93129183, filed on Sep. 27, 2004. All disclosure of the Taiwan application is incorporated herein by reference.

BACKGROUND OF THE INVENTION

1. Field of the Invention

The present invention relates to a power-saving circuitry and method of CPU, and more particularly, to a power-saving circuitry and method of CPU in which the operating voltage is adjusted by changing the voltage identification code.

2. Description of the Related Art

The operating voltage of the CPU in the computer system is determined by a voltage identification code (VID) generated based on its operation mode.

FIG. 1 schematically shows a block diagram of a circuit for providing an operating voltage to the CPU in the prior art. Referring to FIG. 1, the voltage identification code VID is generated in a common computer system based on the required operating voltage Vcore. As shown in FIG. 1, the CPU 101 outputs the voltage identification code VID to a pulse width modulator (PWM) device 103. The pulse width modulator 103 determines a magnitude of the operating voltage Vcore providing to the CPU 101 based on the voltage identification code VID.

The magnitude of the operating voltage required by the CPU is not consistent. For example, when entering a power-saving mode (such as a C3 state), the operating voltage required by the CPU is lower than that required under normal operation. However, some CPU (such as Celeron Pentium M series CPU) do not automatically lower the operating voltage after entering the power-saving mode, thus the power-saving efficiency is rather poor in computer systems with this type of CPU. If laptop computers use such type of CPU with low power-saving efficiency, the life span of the battery would be shortened accordingly.

As aforementioned, such type of CPU with low power-saving efficiency is not the mainstream product in the market. However, in order to reduce the manufacturing cost of the computer system, these CPUs with low power-saving efficiency are still used in some cases. Therefore, how to enhance the power-saving efficiency for the computer system with this type of CPU has become imperative.

SUMMARY OF THE INVENTION

Therefore, an object of the present invention is to provide a power-saving circuitry for CPU capable of reducing the manufacturing cost of the computer system.

Another object of the present invention is to provide a power-saving circuitry suitable for various types of CPU capable of saving power.

Yet another object of the present invention is to provide a method of saving power in a CPU capable of enhancing the power-saving efficiency of the computer system.

The present invention provides a power-saving circuitry of CPU. The power-saving circuitry of CPU comprises a switching transistor having a first source/drain electrode, a second source/drain electrode, and a gate electrode. Wherein, the first source/drain electrode of the switching transistor is grounded, the second source/drain electrode of the switching transistor is electrically coupled to a DC power, and the gate electrode of the switching transistor is electrically coupled to the CPU. When the CPU is under normal operation mode, the switching transistor is turned on. When the CPU enters a power-saving mode (such as C3 state), the switching transistor is turned off. In addition, the present invention further comprises a diode. Wherein, an anode of the diode is electrically coupled to the second source/drain electrode of the switching transistor, and a cathode of the diode is electrically coupled to a highest bit code of the voltage identification code of the CPU, so as to output the highest bit code of the voltage identification code of the CPU.

According to another aspect of the present invention, the present invention provides a power-saving method of CPU. Wherein, when the CPU is under normal operation mode, a first operating voltage is required for operation, and when the CPU enters a power-saving mode, a second operating voltage is required for operation. The power-saving method of CPU of the present invention comprises adjusting a state of the voltage identification code of the CPU when the operating voltage of the CPU under the power-saving mode is not lower than the first operating voltage.

In accordance with an embodiment of the present invention, the identification code switching circuitry comprises a third switching transistor. Wherein, a gate electrode of the third switching transistor is electrically coupled to the control terminal of the identification code switching circuitry for receiving the selection signal, a first source/drain electrode of the third switching transistor receives one bit code of the voltage identification code, and a second source/drain electrode of the third switching transistor is electrically coupled to the output terminal of the identification code switching circuitry. In addition, the identification code switching circuitry further comprises a resistor, which is electrically coupled between the first source/drain electrode and the second source/drain electrode of the third switching transistor.

When the CPU enters the power-saving mode, if the operating voltage of the CPU is lower than that under normal operation mode, the selection signal controls the third switching transistor to be turned on. On the other hand, when the CPU under the power-saving mode requires the same operating voltage with that under the normal operation mode, the selection signal controls the second switching transistor to be turned on.

According to another aspect of the present invention, the present invention provides a power-saving method of CPU. Wherein, when the CPU is under normal operation mode, a first operating voltage is required for operation, and when the CPU enters a power-saving mode, a second operating voltage is required for operation. The power-saving method of CPU of the present invention comprises adjusting a state of the voltage identification code of the CPU when the second operating voltage is not lower than the first operating voltage.

In accordance with an embodiment of the present invention, the step of adjusting the voltage identification code comprises enabling a highest bit code of the voltage identification code.

In summary, when the CPU enters the power-saving mode, the highest bit code of the voltage identification code is enabled such that the operating voltage providing to the CPU is lowered involuntarily. Therefore, the present invention allows CPUs with low power-saving efficiency to be used in the computer system, which reduces the manufacturing cost, while ensuring the high power-saving efficiency.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2 schematically shows a comparison table of the voltage identification code and its corresponding operating voltage.

DESCRIPTION OF THE EMBODIMENTS

FIG. 2 schematically shows a comparison table of the voltage identification code and its corresponding operating voltage. It is obvious from the table shown in FIG. 2, when the value of the highest bit code of the voltage identification code, namely the 5th code bit of the voltage identification code, changes from 0 to 1, a maximum drop, about 0.152V, of the operating voltage Vcore occurs. Accordingly, in the embodiment described below, if the operating voltage of the CPU under the power-saving mode (such as a C3 state) is not lower than that under the normal operation mode, the state of the highest bit code of the voltage identification code is adjusted automatically, so as to lower the operating voltage providing to the CPU to a power-saving level. However, it will be apparent to one of the ordinary skill in the art that the present invention is not necessarily limited to adjusting the highest bit code of the voltage identification code. The state of the voltage identification code can be adjusted by one of the ordinary skill in the art based on the requirement in order to save power.

Figure 1:
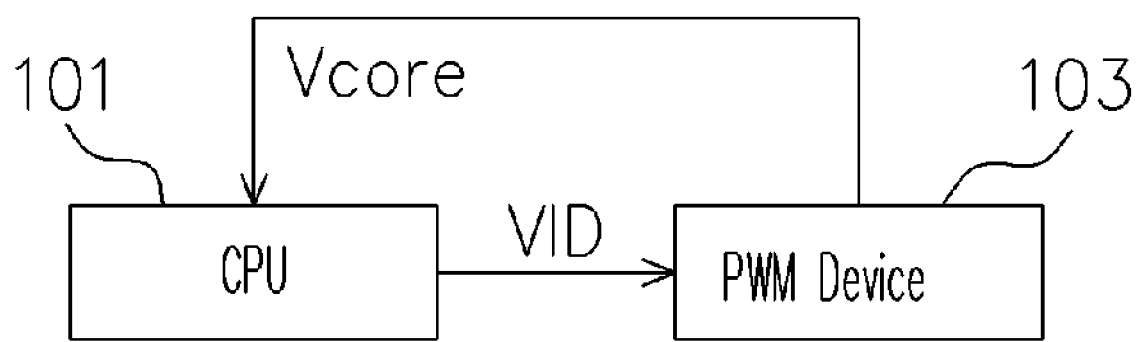
FIG. 1 schematically shows a block diagram of a circuit for providing an operating voltage to the CPU in the prior art.
Figure 3:
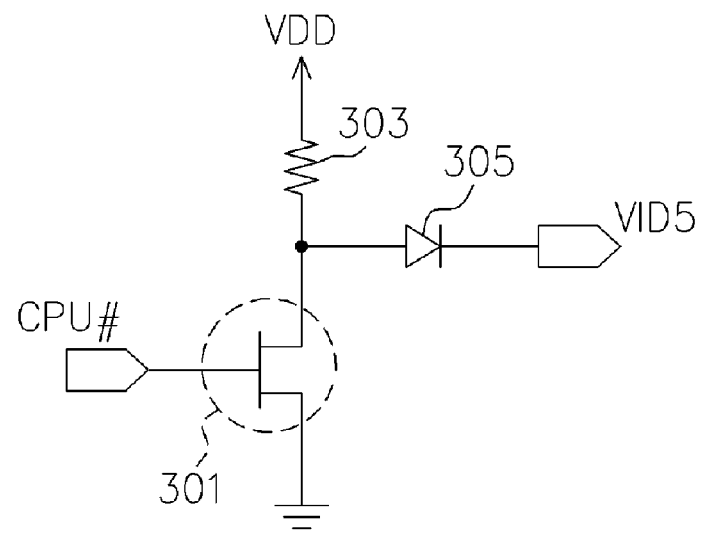
FIG. 3 schematically shows a diagram of a power-saving circuitry of CPU according to an embodiment of the present invention.

As aforementioned, FIG. 3 schematically shows a diagram of a power-saving circuitry of CPU according to an embodiment of the present invention. A power-saving circuitry of CPU is provided to adjust the highest bit code of the voltage identification code. Wherein, a gate electrode of a switching transistor 301 (such as a NMOS transistor) is electrically coupled to a CPU (such as the CPU 101 shown in FIG. 1) for detecting a power signal CPU#. In addition, a first source/drain electrode of the switching transistor 301 is grounded, a second source/drain electrode of the switching transistor 301 is electrically coupled to a DC power VDD via a pull-up resistor 303 for determining a state of the highest bit code (such as VID5) of the voltage identification code outputted by the CPU through a diode 305. Wherein, an anode of a diode 305 is coupled to a second source/drain electrode of the switching transistor 301 for determining the state of the highest bit code VID 5 of the voltage identification code based on the output of a cathode of the diode.

Referring to FIG. 3, in the present embodiment, when the CPU enters the power-saving mode, the power signal CPU# is disabled; that is, the power signal CPU# is in a low voltage level, and the switching transistor 301 is turned off accordingly. After the switching transistor 301 is turned off, the voltage on the second source/drain electrode of the switching transistor 301 is pulled up to a high voltage level by a pull-up resistor, such that the diode 305 is turned on, and the highest bit code VID5 of the voltage identification code is enabled involuntarily. Then, the pulse width modulator device 103 shown in FIG. 1 adjusts the operating voltage providing to the CPU based on the new voltage identification code.

Although the power signal CPU# is in a low voltage level when the CPU enters the power-saving mode in the embodiment mentioned above, it does not mean that the present invention only applies to a low level state. For example, when the CPU enters the power-saving mode, the power signal CPU# is enabled, or the power signal CPU# is in a high voltage level, simply by using the PMOS transistor as the switching transistor instead of the original NMOS transistor, and this method is also suitable for the following embodiments. In addition, the present invention can be modified by one of ordinary skill in the art based on the requirement.

Figure 4:
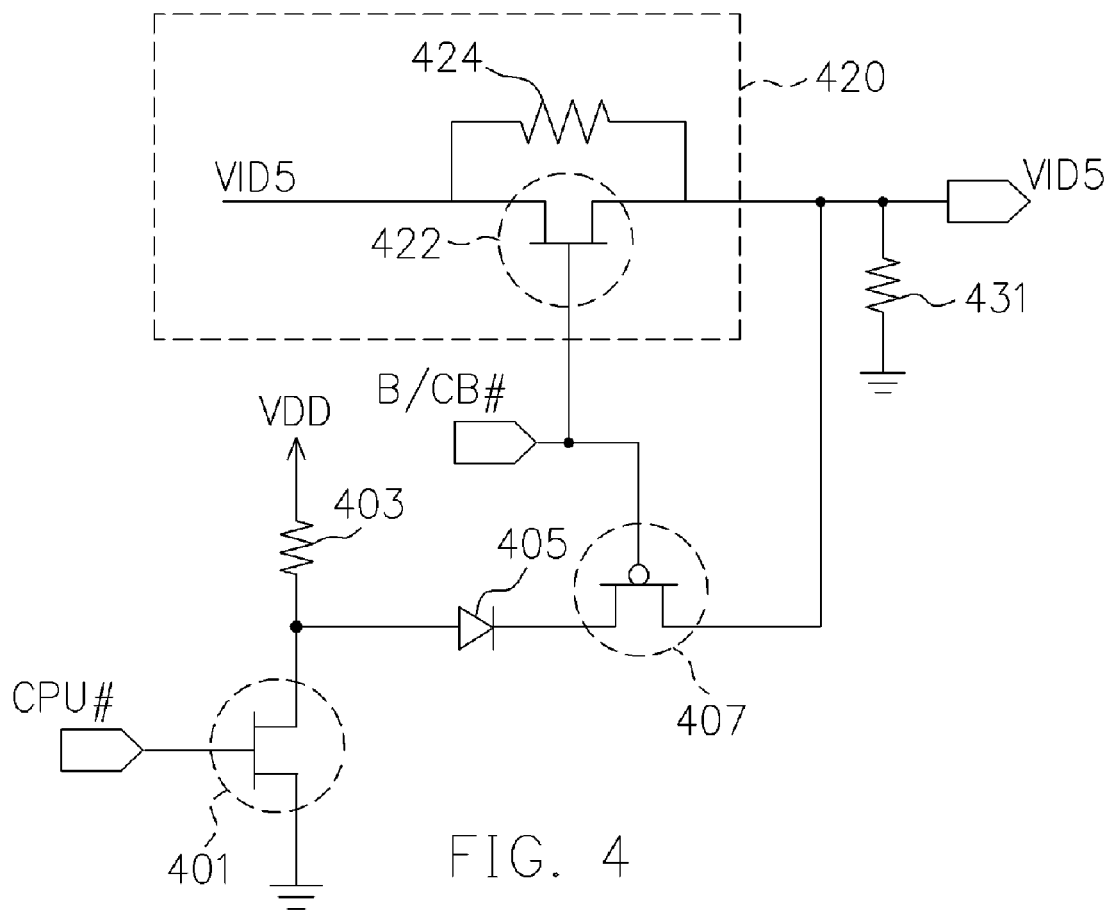
FIG. 4 schematically shows a diagram of a power-saving circuitry of CPU according to another embodiment of the present invention.

FIG. 4 schematically shows a diagram of a power-saving circuitry of CPU according to another embodiment of the present invention. Referring to FIG. 4, in order to make the present invention suitable for various CPUs, another type of power-saving circuitry is provided in FIG. 4. Similar to the power-saving circuitry provided in FIG. 3, a first source/drain electrode of a first switching transistor 401 is grounded, a second source/drain electrode of the first switching transistor 401 is electrically coupled to a DC power VDD via a pull-up resistor 403, and a gate electrode of the first switching transistor 401 is electrically coupled to the CPU (such as the CPU 101 shown in FIG. 1) for detecting a power signal CPU#. In addition, the second source/drain electrode of the first switching transistor 401 is further electrically coupled to an anode of a diode 405, and a cathode of the diode 405 is electrically coupled to a first source/drain electrode of a second switching transistor 407. A gate electrode of the second switching transistor 407 receives a selection signal B/CB# provided by a general-purpose input/output unit (such as a BIOS chip), and is also electrically coupled to a control terminal of an identification code switching circuitry 420. A second source/drain electrode of the second switching transistor 407 is electrically coupled to an output terminal of the identification code switching circuitry 420 for determining a state of the highest bit code of the voltage identification code.

In the present embodiment, the first switching transistor 401 may be a NMOS transistor, and the second switching transistor 407 may be a PMOS transistor. However, the present invention is not limited thereto.

The identification code switching circuitry 420 comprises a third switching transistor 422. In the present embodiment, the third switching transistor 422 is a NMOS transistor. Wherein, a first source/drain electrode of the third switching transistor 422 receives one bit code (i.e. the highest bit code VID5) of the voltage identification code provided by the CPU, a second source/drain electrode of the third switching transistor 422 is electrically coupled to the output terminal of the identification code switching circuitry 420, and a gate of the third switching transistor 422 is electrically coupled to the control terminal of the identification code switching circuitry 420. In addition, the identification code switching circuitry 420 further comprises a resistor 424. Wherein, the resistor 424 is electrically coupled between the first source/drain electrode and the second source/drain electrode of the third switching transistor 422.

In the present embodiment, the output terminal of the identification code switching circuitry 420 and the second source/drain electrode of the second switching circuitry 407 are jointly grounded via a pull-down resistor 431.

It is assumed that a first operating voltage is required for the CPU under a normal operation mode, and a second operating voltage is required under the power-saving mode. If the present invention is applied in a CPU having higher power-saving efficiency; that is, a CPU with higher first operating voltage than the second operating voltage, the general-purpose input/output unit makes the selection signal B/CB# high voltage level, and the third switching transistor 422 turned on accordingly. Meanwhile, the pulse width modulator device 103 shown in FIG. 1 determines the magnitude of the operating voltage providing to the CPU based on the voltage identification code generated by the CPU.

If the second operating voltage of the CPU in the present invention is not lower than the first operating voltage, the general-purpose input/output unit makes the selection signal B/CB# low voltage level, and the second switching transistor 407 turned on accordingly. Meanwhile, when the CPU is under normal operation mode, the power signal CPU# may be in a high voltage level, thus the first switching transistor 401 makes the second source/drain electrode turned on and grounded. Therefore, the diode 405 is regarded as open, and the highest bit code VID5 of the voltage identification code becomes "0" with the operation of the pull-down resistor 431. Meanwhile, the operating voltage required by the CPU is provided by the pulse width modulator device 103 of FIG. 1.

Referring to FIG. 4, when the general-purpose input/output unit makes the second switching transistor 407 turned on, if the CPU enters the power-saving mode, the power signal CPU# becomes low voltage level, thus turning off the first switching transistor 401. Meanwhile, the second source/drain electrode of the first switching transistor 401 is pulled up to a high voltage level by the pull-up resistor 403, and the diode 405 is turned on accordingly. In addition, the highest bit code of the voltage identification code becomes "1" with the operation of the second switching transistor 407. Then, the pulse width modulator device 103 lowers the operating voltage providing to the CPU in accordance with the table in FIG. 2.

In summary, the present invention has at least the following advantages.

1. The present invention adjusts the operating voltage providing to the CPU by changing the state of the voltage identification code. Therefore, when the CPU enters the power-saving mode, the operating voltage provided to the CPU can be lowered involuntarily, thereby saving power.

2. As described in the first advantage, the CPU with the same first operating voltage and the second operating voltage (which has lower price) can be used in the computer system. Therefore, the present invention is able to reduce the manufacturing cost of the computer system.

3. Either the second switching transistor or the third switching transistor is turned on in the present invention, thus the present invention can be applied in both the general CPU and the CPU with poor power-saving efficiency.

4. The present invention enhances the life span of the battery in the laptop computer system which uses the CPU with poor power-saving efficiency.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A power-saving circuitry of CPU, wherein an operating voltage of the CPU is adjusted based on a voltage identification code, and one bit code of the voltage identification code is outputted via an identification code switching circuitry, and the power-saving circuitry comprises:

a first switching transistor having a first source/drain electrode, a second source/drain electrode, and a gate electrode, wherein the first source/drain electrode of the first switching transistor is grounded, the second source/drain electrode of the first switching transistor is electrically coupled to a DC power, and the gate electrode of the first switching transistor is electrically coupled to the CPU, and when the CPU is under a normal operation mode, the first switching transistor is turned on, and when the CPU is under a power-saving mode, the first switching transistor is turned off;

a diode having an anode electrically coupled to the second source/drain electrode of the switching transistor; and a second switching transistor having a first source/drain electrode, a second source/drain electrode, and a gate electrode, wherein the first source/drain electrode of the second switching transistor is electrically coupled to the cathode of the diode, the second source/drain electrode of the second switching transistor is electrically coupled to an output terminal of the identification code switching circuitry for determining a state of the voltage identification code, and the gate electrode of the second switching transistor is electrically coupled to a control terminal of the identification code switching circuitry for receiving a selection signal to turn on either the second switching transistor or the identification code switching circuitry, wherein the identification code switching circuitry comprises:

a third switching transistor having a first source/drain electrode, a second source/drain electrode, and a gate electrode, wherein the gate electrode of the third switching transistor is electrically coupled to the control terminal of the identification code switching circuitry for receiving the selection signal, the first source/drain electrode of the third switching transistor receives one bit code of the voltage identification code, and the second source/drain electrode of the third switching transistor is electrically coupled to the output terminal of the identification code switching circuitry; and a resistor electrically coupled between the first source/drain electrode and the second source/drain electrode of the third switching transistor.

2. The power-saving circuitry of CPU of claim 1, wherein when the operating voltage of the CPU under the power-saving mode is lower than that under the normal operation mode, the selection signal makes the third switching transistor turned on.

3. The power-saving circuitry of CPU of claim 1, wherein when the operating voltage of the CPU under the power-saving mode is equal to that under the normal operation mode, the selection signal makes the second switching transistor turned on.

4. The power-saving circuitry of CPU of claim 1, wherein the second source/drain electrode of the first switching transistor is further electrically coupled to the DC power via a pull-up resistor.

5. The power-saving circuitry of CPU of claim 1, wherein the second resource/drain electrode of the second switching transistor is further grounded via a pull-down resistor.

6. The power-saving circuitry of CPU of claim 1, wherein the first switching transistor is a NMOS transistor, and the second switching transistor is a PMOS transistor.

* * * * *